UNITED STATES PATENT OFFICE.

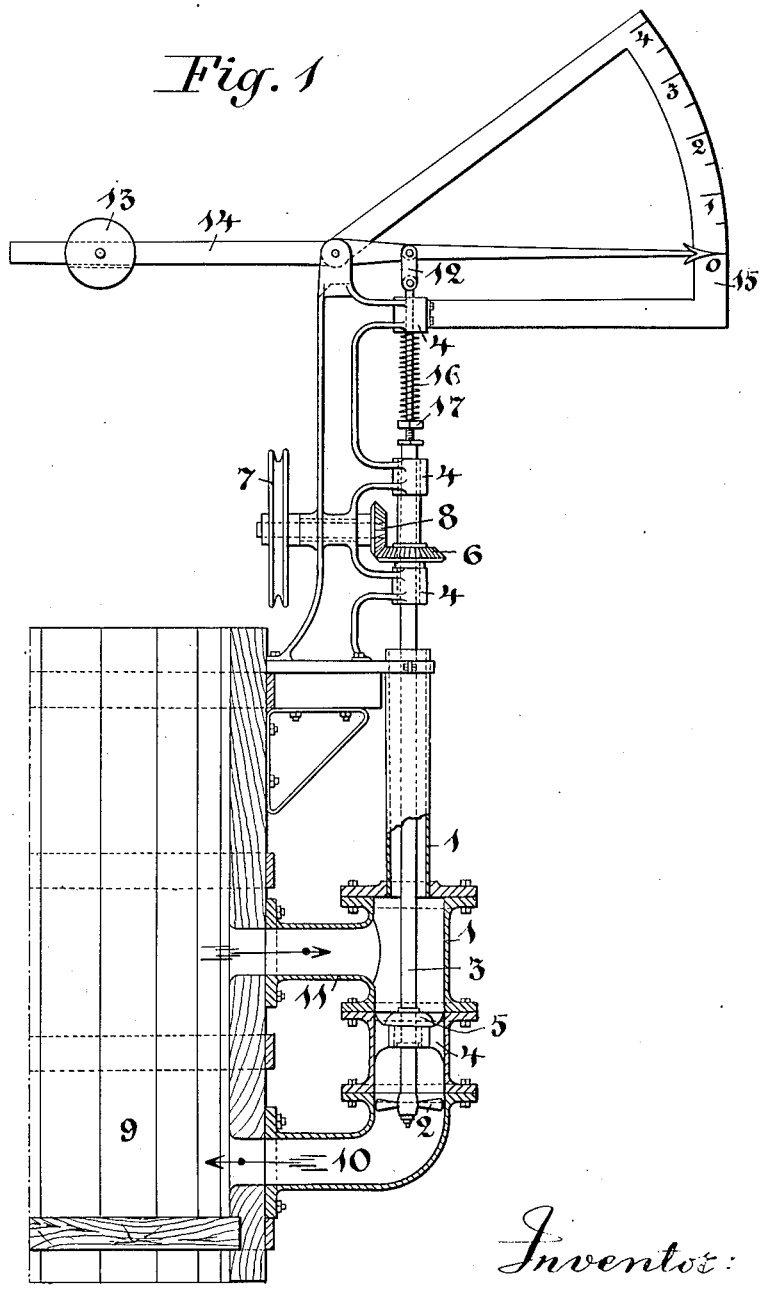

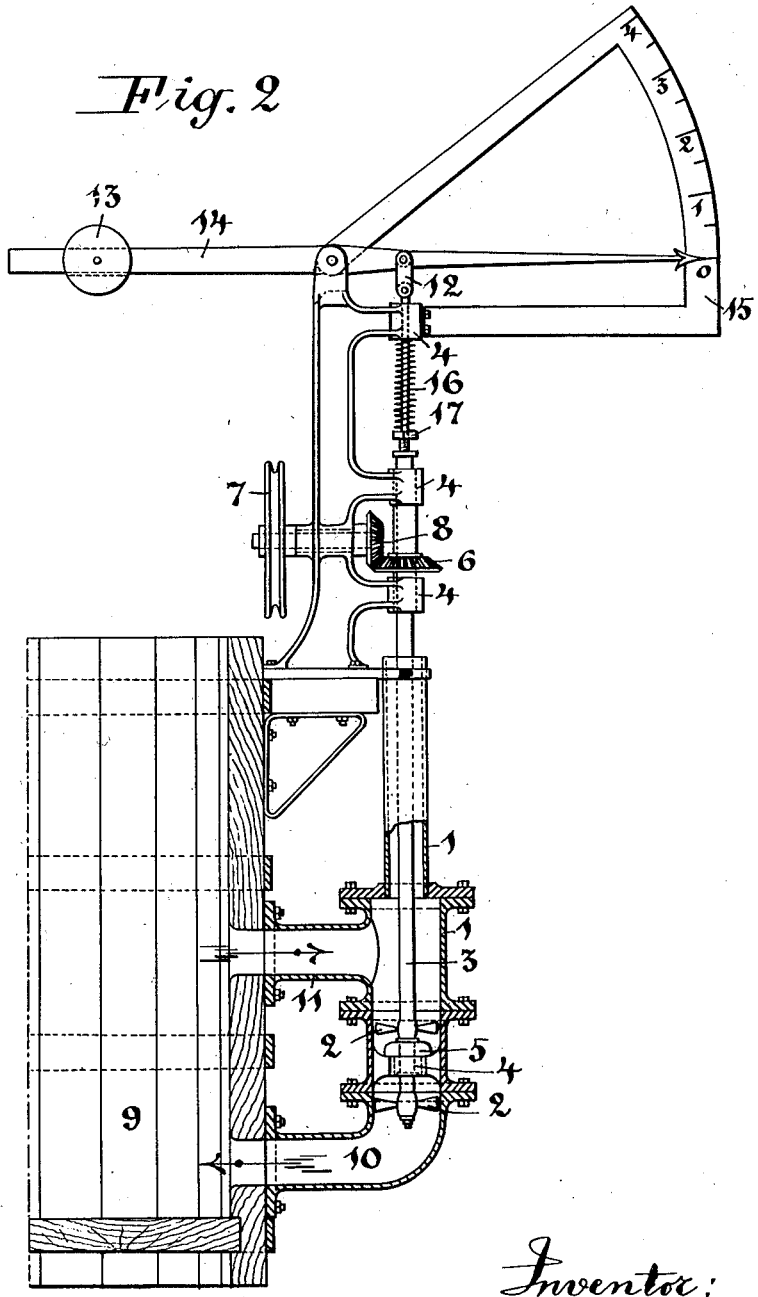

ALVAR MÜNTZING, OF STOCKHOLM, SWEDEN.

DENSIMETER.

No. 913,420.  Specification of Letters Patent.  Patented Feb. 23, 1909.

Application filed November 3, 1905. Serial No. 285,735.

*To all whom it may concern:*

Be it known that I, ALVAR MÜNTZING, a subject of the King of Sweden, and resident of Vestra Trädgårdsgatan 11$^B$, Stockholm, in the Kingdom of Sweden, have invented certain new and useful Improvements in Densimeters, of which the following is a specification, reference being had therein to the accompanying drawing.

This invention relates generally to testing apparatus, and more particularly to a novel arrangement of mechanism for indicating the relative thickness of liquids, containing suspended matters or consisting of solutions. The said apparatus is adapted especially for indicating the thickness of paper-pulp or the relative quantity of fibers in the same, which is led to a paper-machine from the so called stuff-chest and is described in the following specification as used for that purpose.

In the accompanying drawings, forming a part of this specification, and in which like characters of reference indicate corresponding parts, Figure 1 is a view in side elevation, partly in section, of an apparatus constructed in accordance with the present invention. Fig. 2 is a similar view of a slightly modified form of the apparatus.

The said apparatus substantially consists of a propeller 2 rotating in a tube 1. The shaft 3 of the said propeller is mounted in bearings 4 and provided with a collar or flange 5, resting on the bottom bearing when the propeller is inactive. The shaft 3 is movable longitudinally in the said bearings and the shaft with the propeller is caused to rotate by a suitable motion transmitting device, consisting in the drawing of a bevel gear 6, in the hub of which the shaft 3 can slide but not rotate, and a bevel gear 8 driven by pulley 7 or the like. The tube 1 communicates with the stuff-chest 9 through two branch pipes 10, 11 on each side of the propeller, one situated near the bottom of the stuff-chest and the other at a higher level. The top end of the shaft is connected by means of a link 12 with an arm 14, swinging vertically and counterbalanced by a weight 13, said arm forming the pointer to a scale 15. On the shaft 3 a coil-spring 16 is mounted resting against one of the bearings 4 and a nut 17 on the shaft, by means of which nut the tension of the spring can be regulated. The tube 1, which is open at its upper end, extends upward substantially to the same level as the stuff-chest.

The apparatus described above operates in the following manner. The pulp in the stuff-chest 9 nearest to the apparatus is caused to circulate by the propeller, which is rotated at a suitable speed by the said means and in such direction that it forces the pulp from the pipe 11 back into the stuff-chest through the pipe 10. Owing to the resistance exerted by the pulp against the rotation of the propeller, the propeller with its shaft will be moved upward for some distance, swinging the pointer 14 to a certain position on the scale 15. The thicker the pulp is *i. e.* the greater quantity of fibers it contains, the greater resistance it exerts against the rotation of the propeller and to the higher lever the propeller and the pointer are moved. Thus it will be seen that the thicker the pulp is the greater is the deflection of the pointer. Consequently by means of the apparatus described above any change in the proportion of fibers in the pulp can be observed, so that such steps can be taken as are necessary for the manufacturing of a uniform paper, as for instance an alteration in the consistence of the pulp or an alteration of the supply of pulp to the machine. Apparatus arranged in accordance with this invention may, evidently, be employed for the purpose stated also for such liquids in which other solid bodies than fibers are suspended as well as for solutions with a varying specific weight. By means of the said spring 16 the movement of the shaft and the pointer, when alterations in the thickness of the pulp take place, is regulated. The said spring, however, is not necessary in every case. Instead of the indicating device pointer and scale shown in the drawing any other indicating device may be used which is capable of showing the movement of the propeller longitudinally to the axis of rotation. The driving device may also be substituted by any other suitable for the purpose. Instead of one propeller two or more propellers fixed on the same shaft may be employed, as shown in Fig. 2. My invention may evidently be modified in many other respects without exceeding the limits of the following claims.

Having now described my invention, what I claim as new and desire to secure by Letters Patent is:

1. In a densimeter, the combination with a tank containing a substance of undetermined density, of a propeller, a chamber in which the said propeller is journaled and slidable longitudinally to its axis of rotation, means through which the chamber communicates on each side of the propeller with the tank, a yielding resistance against the sliding movement of the propeller, means for rotating the propeller at a predetermined speed, and means for indicating the amount of said sliding movement.

2. In a densimeter, the combination with a tank containing a substance of undetermined density, of a number of propellers mounted on the same shaft, a chamber in which the said propellers are journaled and slidable longitudinally to the axis of rotation, means through which the said chamber communicates on each side of the series of propellers with the tank, a yielding resistance against the sliding movement of the propellers, means for rotating the propellers at a predetermined speed, and means for indicating the amount of sliding movement.

3. In a densimeter, the combination with a tank containing a substance of undetermined density, of a passage-way communicating with two levels of the substance, a slidable shaft within the passage-way, a plurality of propellers carried by the shaft, a frame in which the said propellers are journaled, a yielding resistance against the sliding movement of the propellers, means for rotating the propellers at a predetermined speed, and means for indicating the amount of said sliding movement.

4. In a densimeter, the combination with a tank containing a substance of undetermined density, of a propeller, a chamber in which the said propeller is journaled and slidable longitudinally to its axis of rotation and which communicates on each side of the propeller with the tank, a yielding resistance against the sliding movement of the propeller, means for rotating the propeller at a predetermined speed, and means for indicating the amount of said sliding movement.

In witness whereof I have hereunto signed my name this 21st day of October 1905, in the presence of two subscribing witnesses.

ALVAR MÜNTZING.

Witnesses:
ROBERT ASSELGREU,
CARL FRIBERG.